Oct. 5, 1965  J. PALMER ETAL  3,209,910
MIXTURE SEPARATING APPARATUS
Filed Dec. 19, 1962  4 Sheets-Sheet 2
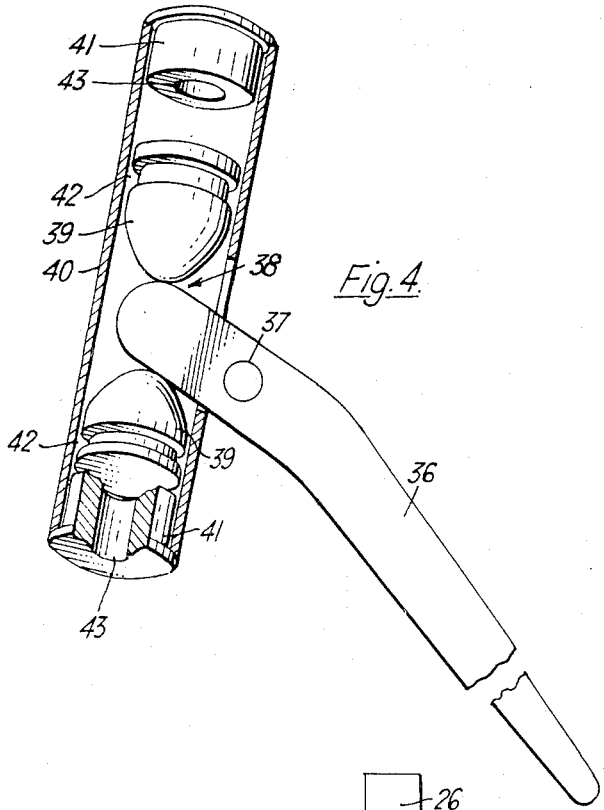
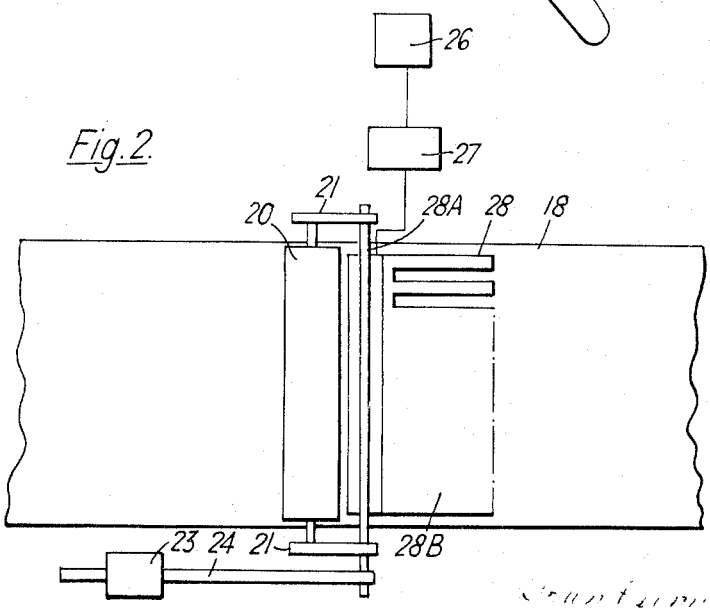

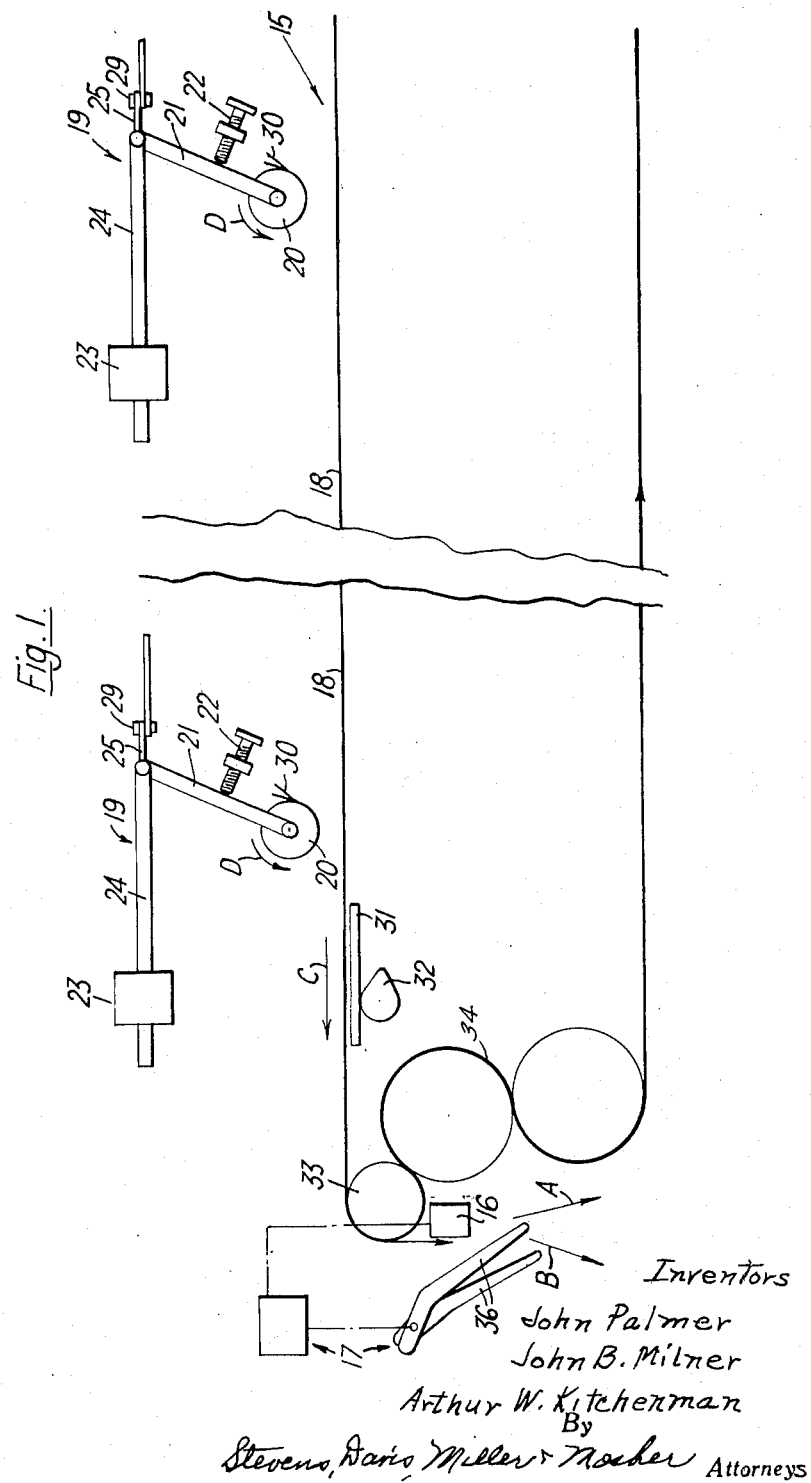

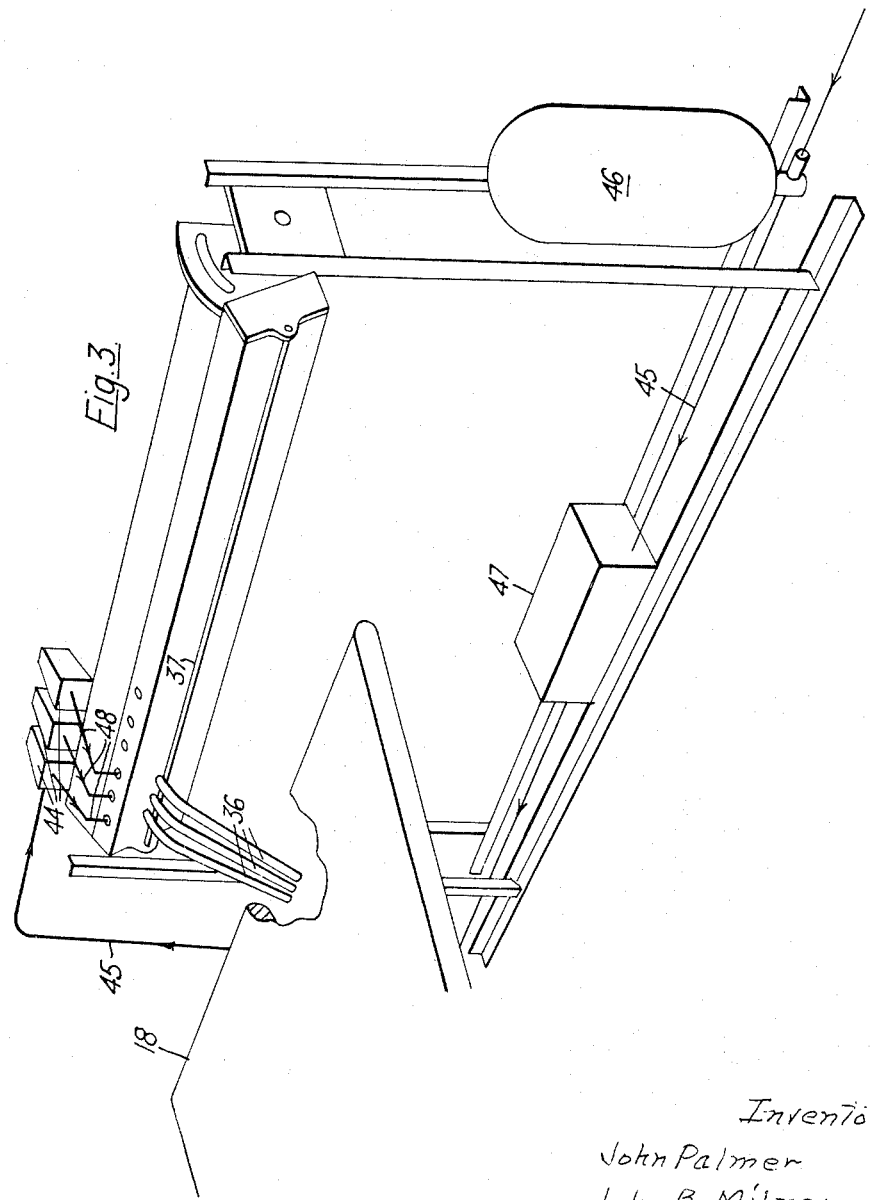

United States Patent Office 3,209,910
Patented Oct. 5, 1965

3,209,910
MIXTURE SEPARATING APPARATUS
John Palmer, John B. Milner, and Arthur W. Kitchenman, Midlothian, England, assignors to National Research Development Corporation
Filed Dec. 19, 1962, Ser. No. 245,701
Claims priority, application Great Britain, Dec. 22, 1961, 45,972/61
4 Claims. (Cl. 209—74)

This invention relates to apparatus for separating a particular constituent from a mixture of solid objects, and is particularly suitable for separating a root crop, such as potatoes, from a mixture comprising the crop, stones, clods of earth and other extraneous material.

This invention is the combination, in or for mixture separating apparatus, of an endless conveyor having a substantially horizontal run, and loaded roller means spaced above the run and transverse thereto for effecting spread of the mixture on the conveyor.

A section of the conveyor downbelt of the roller means may be vibrated to ensure that the mixture is loosely packed on the conveyor.

The loaded roller means may comprise one or more rollers pivotally mounted to swing about an axis transverse to the conveyor.

Each successive roller may be spaced closer to the belt than its predecessor.

The invention is also separating mechanism in or for mixture separating apparatus and comprising a number of separating units each of which comprises a pivoted finger, and power means for pivoting the finger to effect a separating operation.

The power means may be an electromagnetic device, or any other high speed device.

The invention is further separating mechanism in or for mixture separating apparatus and comprising a number of separating units each of which comprises a cylinder, a piston associated with the cylinder and having a slot formed in it, and a finger pivoted near one of its ends about an axis transverse to the axis of the cylinder, said end of the finger engaging the slot so that movement of the piston causes pivotal movement of the finger.

An embodiment of the present invention will now be decribed, by way of example, with reference to the accompanying drawings, in which:

FIG. 1 is a diagrammatic side elevation of the mixture spreading and separating apparatus according to the present invention;

FIG. 2 is a corresponding plan view of the spreading apparatus;

FIG. 3 is a sectional perspective view of a separating unit;

FIG. 4 is a fragmentary perspective view of the separating mechanism;

Figure 5:
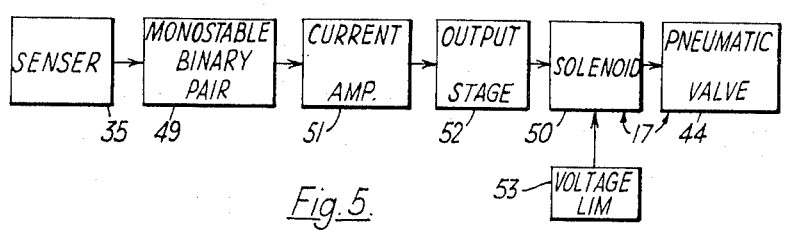
FIG. 5 is a block diagram of the circuit used in the separating apparatus.

Referring to the drawings, the separating apparatus comprises an endless conveyor 15, a sensing unit 16 and a separating mechanism 17. The mixture of solid objects is fed onto a conveyor belt 18 on which it is spread out by a spreading apparatus 19 to form a single layer with space between each object and is discharged from the conveyor belt. While in free fall the mixture is scanned by the sensing device 16 which produces an output signal. The output signal controls the operation of the separating mechanism 17 which directs the particular constituent of the mixture in one direction (arrow A) and the other constituents of the mixture in another direction (arrow B).

On the conveyor belt 18 the mixture is reduced to a single layer by the spreading apparatus 19 which consists of a number of rollers 20, positioned transversely to the belt 18 at intervals along its length. Each roller 20 is mounted between a pair of arms 21 pivoted about a line above and upbelt of it and transverse to the conveyor belt 18. Downward movement of a roller 20 is limited by stops 22 which are adjustable to obtain a gap of desired height between the belt 18 and the roller 20 in its lowest position. Heaped mixture, pressing against a roller 20, tends to lift it through an arc in the direction of belt travel (arrow C) and to prevent this and hold a roller against its stops 22 a torque, which can be preset, is applied to the arms 21 by a weight 23 and a lever 24. Alternatively spring or other torque-applying means can be employed. The rollers are set at heights such that all or most of the mixture can pass beneath them in single layer or, if necessary, in somewhat greater depth i.e. with objects piled one on top of another and are arranged to have a cumulative effect, the mixture being progressively reduced in depth at each roller 20 as it passes down belt 18. The torque, holding a roller 20 against its stops 22, is set so that if an object jams between the belt 18 and roller 20 the latter will lift and thus prevent damage or blockage of the flow. A roller 20 may be fixed, free, or power driven to break up heaps of objects more effectively. If a roller 20 is power driven the direction of rotation is such (arrow D) that its circumferential motion at a point adjacent to the belt 18 is in the opposite sense to that of belt travel so that objects which are not held on the upbelt side of a roller 20 until they fall into a gap in the layer beneath are assisted over. Large round objects tend, however, to remain on the upbelt side of a roller 20 and to pass these a fingered rotating paddle 25 turning in the direction of belt travel is positioned above each roller 20 to push such objects over. The finger lengths are adjustable so that the height above the belt 18 at which the paddle 25 acts on the mixture can be set. The paddle 25 is driven by a suitable prime mover 26 via gearing 27. The paddle fingers 28 each consist of two relatively slidable parts 28A and 28B secured together by nuts and bolts 29 passing through longitudinal slots (not shown) in the paddle fingers which permit length adjustment of the latter. The fingers 28 may be of any suitable construction which permits length adjustment thereof. Each roller 20 is fitted with a scraper 30 to prevent soil building up on its surface and to keep it free of weed or shreds of hauls.

Objects are prevented from being too closely packed before discharge by vibrating a section of the belt surface down belt of the last roller 20. This is achieved by running the belt over the surface of a horizontal plate 31 which is oscillated in the vertical plane by a cam 32 though any other form of vibration may be used. This vibration is to ensure that the mixture is loosely packed on the belt 18 at discharge to ensure that the objects have a substantially uniform trajectory.

Moreover to provide a near vertical trajectory of the objects the end of the belt is provided with a belt tripper incorporating a small diameter roller 33, the belt being snubbed between this and a roller 34 of conventional size.

The sensing unit 35 (FIG. 5), which indicates diagrammatically the sensing unit 16 of FIG. 1, and which does not form part of this invention and will not be described in detail, uses sensing beams to scan the mixture as it falls and actuates the separating mechanism 17 in accordance with a signal produced by the unit during the scanning operation. The sensing unit 35 may scan the mixture by means of ionising radiation or it may operate utilising the properties of light reflected from the objects.

The separating mechanism 17 comprises a bank of sloping fingers 36 positioned horizontally to intercept the objects in free fall. Each finger 36 is below a sensing beam and associated with it. The sensing equipment signals whether or not a finger 36 is to be actuated depending on the nature of the object interrupting the beam. The actuating equipment receives the signal from the sensing unit 35 and either retains a finger 36 in its normal "up" position, so that an object striking it is deflected forwards, or lowers the finger 36 for a predetermined time, during which the object passes in free fall, before raising it to its original position. In consequence the desired separation is achieved.

The fingers 36 may be actuated by any suitable power means provided the pivoting action of the fingers is speedy. For example, each finger may be operated by an electromagnetic device controlled by the sensing equipment.

The fingers 36 are formed of nylon and are of circular cross-section (see FIG. 4). Each finger 36 is tapered for lightness and pivoted near the thicker end for vertical movement about a horizontal axis 37. Each finger 36 enters a slot 38 in a nylon piston 39 housed in a cylinder 40, the finger 36, cylinder 40 and piston 39 forming a unit. Each piston 39 can oscillate in straight line motion within the cylinder 40, preferably formed of brass. The stroke, and therefore the angular travel of a finger 36, is determined by the position of two "Prescollan" stops 41, one inserted at each end of the cylinder 40. The piston 39 is grooved at each end as indicated at 42 to accommodate standard U type piston seals (not shown). Air can be supplied to or discharged from either end of a cylinder 40 through a hole 43 in each stop 41.

The piston 39 is at rest at one end (see FIG. 4) of its stroke corresponding to normal "up" position of the finger 36. It is moved to the opposite end of its stroke and returned to its original position, thus deflecting the finger 36 downwards instantaneously, by a compressed air supply controlled by a conventional, solenoid operated, 4-way pneumatic spool type valve 44. The valve 44 passes air to one or other end of the cylinder 40 and allows air in the opposite side to exhaust to atmosphere. The solenoid is controlled by a electronic circuit so designed that a complete cycle of operation of the finger 36 may be initiated by a short electrical pulse from the sensing unit 35. Compressed air is fed to the valves 44 from a suitable source (not shown) via a line 45 having associated therewith an air accumulator 46 and a filter and lubricator unit 47. The compressed air is delivered from the valves 44 to the cylinders 40 via lines 48.

In the electronic circuit (FIG. 5) a pulse from the sensing unit 35 triggers a monostable binary pair 49 which is so proportioned that its generates a pulse of sufficient duration to operate the solenoid 50. The binary pulse power is increased by a current amplifier 51 and the pulse is used to turn on an output stage 52 and so energise the solenoid 50. At the end of the binary pulse the energy stored in the solenoid 50 as a magnetic field is prevented by means of a voltage limiter 53 from generating a high voltage which could damage the output stage 52. The circuit may be designated about transistors or about thermionic valves. A transistor version is described below.

Figure 6:
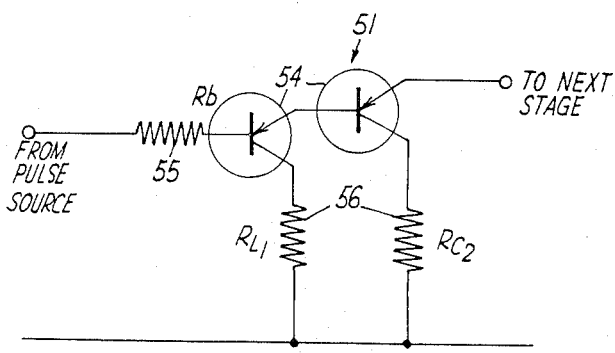
FIG. 6 illustrates the connections in the current amplifier.

The monostable binary pair is conventional and needs no further description. The current amplifier (FIG. 6) consists of a series of common collector P-N-P transistors 54 connected in cascade. A resistor 55 connected in the base circuit of the input transistor 54 is chosen to reduce damping of the binary pulse source and resistors 56 connected in the collector circuits of the transistors 54 determine the maximum current carried by each transistor 54. The solenoid 50 is connected between the output transistor collector and the negative supply and is shunted by the voltage limiter 53 which consists of a rectifier in series with a resistor, the rectifier being connected so that it conducts when the collector is negative relative to the negative supply, the resistor being of such value that the voltage developed across it does not overstress the output transistor 54. The advantage of using this resistor is that the energy in the solenoid 50 is dissipated more rapidly and therefore the solenoid 50 can return to its unenergised position more quickly.

We claim:

1. Separating apparatus for separating pieces from a mixture comprising endless conveyor means, a separating mechanism, said mixer being spread on and conveyed by said conveyor means to said separating mechanism, said separating mechanism comprising a plurality of cylinders each having a slot located therein, a plurality of fingers spaced across the width of said conveyor means, each with a portion lying in the path of the pieces to be separated as they are discharged from said conveyor means and each being pivoted near one of its ends about an axis transverse to the axis of the cylinders, to pistons slidably mounted within each of said cylinders, one end of each of said fingers being disposed through the slot of a respective cylinder and between said pistons, valve means for conducting air to and from the ends of each of said cylinders to pivot the free end of each of said fingers to at least two separate positions in the path of said pieces, a solenoid for actuating said valve means, and sensing means for scanning and detecting the nature of the pieces to be separated and emitting an electrical pulse to said solenoid to selectively deflect said pieces accordingly, whereby a complete cycle of operation of said fingers may be effected by an electrical pulse from said sensing means.

2. An apparatus for separating pieces from a mixture comprising an endless conveyor to carry said mixture, a spreading device for spreading said mixture, said spreading device comprising a plurality of rollers each pivotally mounted over said conveyor at progressively decreasing distances from said conveyor in the direction of movement thereof, two parallel arms connected to each of said rollers and pivoted on an axis transverse to the direction of movement of said conveyor, adjustable stop means for engaging at least one of said arms to limit the approach of each of said rollers to said conveyor, and biasing means connected to at least one of said arms to apply to predetermined force on each of said rollers to permit spreading of said material and yielding of said rollers when jamming occurs; an a separating mechanism to separate the pieces of said mixture as they are discharged from said conveyor, said separating mechanism comprising a plurality of cylinders each defining a slot therein, a plurality of fingers spaced across the width of said conveyor means, each with a portion lying in the path of said pieces as they are discharged from said conveyor and each being pivoted near one of its ends about an axis transverse to the axis of the cylinders, two pistons slidably mounted within each of said cylinders, one end of each of said fingers being disposed through the slot of a respective cylinder and between said pistons, valve means for conducting air to and from the ends of each of said cylinders to pivot the free end of each of said fingers to at least two separate positions in the path of said pieces, a solenoid for actuating said valve means, and sensing means for scanning and detecting the nature of the pieces to be separated and emitting an electrical pulse to said solenoid to selectively deflect said pieces accordingly, whereby a complete cycle of operation of said fingers may be effected by an electrical pulse from said sensing means.

3. The apparatus of claim 2 wherein said biasing means comprises a lever connected at one end to said arm and a weight mounted on said lever.

4. The apparatus of claim 3 wherein said weight is movable to a plurality of positions on said lever to vary said force on said rollers according to the particular material to be spread.

References Cited by the Examiner

UNITED STATES PATENTS

| | | | |
|---|---|---|---|
| 1,647,704 | 11/27 | Lea | 198—39 |
| 1,690,877 | 11/28 | Ramsay | 198—127 |
| 1,966,243 | 7/34 | Hanna | 209—111.5 X |
| 2,059,038 | 10/36 | Sala | 209—88 X |
| 2,231,435 | 2/41 | Christian | 209—90 |
| 2,570,367 | 10/51 | Mitten | 198—57 X |
| 2,718,965 | 9/55 | Cundall | 209—111.7 |
| 2,876,747 | 3/59 | Dermond | 92—138 X |
| 2,920,355 | 1/60 | Clark | 198—167 X |
| 2,962,590 | 11/60 | Scherbatskoy | 250—71.5 |
| 2,988,219 | 6/61 | Bartlett | 209—111.6 |
| 3,025,961 | 3/62 | Yetterland | 209—73 |
| 3,052,353 | 9/62 | Pritchett | 209—111.5 |
| 3,137,392 | 6/64 | Slight | 209—111.7 |

M. HENSON WOOD, Jr., *Primary Examiner.*

ROBERT B. REEVES, SAMUEL F. COLEMAN,
*Examiners.*